(12) United States Patent
Srinivasan

(10) Patent No.: US 6,717,936 B1
(45) Date of Patent: Apr. 6, 2004

(54) DIRECTORY TALK SERVICE AND SYSTEM

(75) Inventor: Thiru Srinivasan, Highland Ranch, CO (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 09/134,665

(22) Filed: Jul. 29, 1998

(51) Int. Cl.$^7$ .............................................. H04L 12/66
(52) U.S. Cl. ..................................................... 370/352
(58) Field of Search ................................ 370/352, 353, 370/354, 355, 356, 401, 402, 403, 404; 379/265.09, 900

(56) References Cited

U.S. PATENT DOCUMENTS 5,991,291 A  * 11/1999 Asai et al. ................... 370/352
6,097,793 A  *  8/2000 Jandel ...................... 379/93.23
6,526,129 B1 *  2/2003 Beaton et al. ............ 379/90.01

OTHER PUBLICATIONS

IP Telephony Takes Off; Matthew Friedman; Dec. 5, 1997; http://www.techweb.com/wire/story/TWB19971205S0002.

Applications for IP Telephony; Apr. 23, 1998; http://www-.dialogic.com/solution/internet/4071.web.htm.

* cited by examiner

*Primary Examiner*—Kwang Bin Yao
(74) *Attorney, Agent, or Firm*—Marsh Fischmann & Breyfogle LLP

(57) ABSTRACT

A communications system incorporated into a network server provides a number of modes for a system user to communicate with a selected person (subscriber). The subscribers provide information as to the different modes in which communication may be established. This information may include telephone numbers, cell phone numbers, fax machine numbers, pager numbers, as well as e-mail addresses. All of this information is stored in a database along with the subscriber's name and other pertinent information. The database is searchable for the subscriber's name and other pertinent information. Once the subscriber is found, the system user is provided with a variety of modes to select for establishing communication with the subscriber. The system user then makes a choice on how to communicate with the subscriber and at that point the system, using functionality incorporated therein, establishes the desired mode of communication.

18 Claims, 7 Drawing Sheets

|  | Business Phone | Home Phone | Personal Access Number | Cell Phone | E-Mail | Voice Mail | Pager | Video Phone | Desktop Video Conferencing | Desktop Data Conferencing | Toll Free |
|---|---|---|---|---|---|---|---|---|---|---|---|
| Joan Smith | 555-3535 | 353-0289 | 500-494-223 | 509-3388 | smithj@xxx.com | 555-3535 | 333-225 | 555-3535 | smithj@video.xxx.com | smithj@data.xxx.com | 800-332-335 |
| John Smith | 555-3232 | 282-4913 | 500-392-332 | 514-3909 | smithjo@xxx.com | 553-3232 | 433-669 | 553-3232 | smithjo@video.xxx.com | smithjo@data.xxx.com | 800-444-383 |
| Ken Smith | 555-4545 | 509-4139 | 500-494-431 | 245-3454 | smithk@xxx.com | 555-4545 | 335-202 | 555-4545 | smithk@video.xxx.com | smithk@data.xxx.com | 800-555-377 |
| Kent Smith | 555-5050 | 202-1223 | 500-696-392 | 899-2838 | smithke@xxx.com | 555-5050 | 202-598 | 555-5050 | smithke@video.xxx.com | smithke@data.xxx.com | 800-223-338 |
| Larry Smith | 565-6000 | 267-0329 | 500-483-698 | 895-4739 | smithl@xxx.com | 565-6000 | 431-234 | 565-6000 | smithl@video.xxx.com | smithl@data.xxx.com | 800-255-699 |
| Lois Smith | 566-6060 | 695-7887 | 500-494-412 | 222-2323 | smithlo@xxx.com | 566-6060 | 699-998 | 566-6060 | smithlo@video.xxx.com | smithlo@data.xxx.com | 800-295-387 |
| Stacy Smith | 666-6666 | 232-4143 | 500-333-494 | 507-4030 | smiths@xxx.com | 666-6666 | 239-393 | 668-6666 | smiths@video.xxx.com | smiths@data.xxx.com | 800-861-700 |

FIG.4

JOHNSMITH
TELEPHONE
VIDEO PHONE
E-MAIL
PERSONAL ACCESS
NUMBER
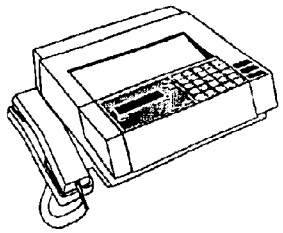
FAX MACHINE
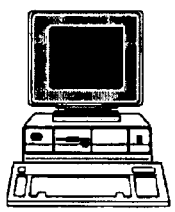
DESKTOP DATA
CONFERENCING
CELLULAR PHONE
DESKTOP
VIDEO CONFERENCING
PAGER
TOLL FREE TELEPHONE
FIG. 6

| | Business Phone | Home Phone | Personal Access Number | Cell Phone | E-Mail | Voice Mail | Pager | Video Phone | Desktop Video Conferencing | Desktop Data Conferencing | Toll Free |
|---|---|---|---|---|---|---|---|---|---|---|---|
| Joan Smith | 555-3535 | 353-0289 | 500-494-2232 | 509-3388 | smithj@xxx.com | 555-3535 | 333-2252 | 555-3535 | smith@video.xxx.com | smith@data.xxx.com | 800-332-335 |

FIG.7

DIRECTORY TALK SERVICE AND SYSTEM

FIELD OF THE INVENTION

The invention described herein relates to a communications system accessible through a data network and in particular to a communications system which provides a plurality of modes of communication.

BACKGROUND OF THE INVENTION

A number of services are currently available on the Internet for obtaining personal information about a particular person. These types of services incorporate a white page or yellow page databases which are searchable by a party at a remotely located user interface. When the web page for one of these services is accessed, a screen display will prompt the system user to insert search terms relating to the person to be located. At a minimum, these terms will include the person's last name, but the search can be further narrowed by entering a first name, a state, and a city. A search is then performed of the database, and if relevant information relating to the search is located it is then presented to the system user through the screen display. The relevant information may include items such as telephone numbers and e-mail addresses.

Once the information for locating or contacting a person has been provided, a system user may manually initiate a number of modes for establishing communication with the identified party. One mode is the use of electronic mail, or e-mail. With e-mail, text messages are exchanged between mailboxes located at the various nodes on a network, such as the worldwide web. Technology also currently exists today for establishing a telephone connection over the worldwide web. Hardware and software can be incorporated into a user interface as well as various nodes on the network in order to establish a connection with the public switch telephone network (PSTN). The software incorporated into the user interface converts voice data to an electronic transmission which is sent over the worldwide web. The node to which the voice data is transmitted establishes a connection through the PSTN to the desired party. A person from a personal computer has the ability to establish a line of communication with another personal computer with IP telephony software, a telephone, a cell phone, a fax machine, or voice mail.

SUMMARY OF THE INVENTION

Described herein is a system for providing multiple modes of communication through a data network. The system may include at least one remotely located user interface which has access to the worldwide web or other networks through a network server. This access may be provided through a telephonic interface incorporated into the server. In order to access the worldwide web, the server includes a network interface which provides for a two way transfer of information. An interface is also included in the server for establishing connections with the the public switched telephone network (PSTN). Through this interface, phone calls can be placed by those who have access to server.

In another aspect of the invention the user interface is connected to the server through a more direct connection such as a local area network (LAN). The server in this case may be in connection with a number of computers and also have direct connection to an external data network such as the worldwide web. The server would also include an interface for placing telephone calls over the PSTN.

For the parties which have access to the server either through the telephone lines or over the worldwide web, the server may be used to facilitate communication between parties. In one example, the server may include the functionality to establish connections over the public switch telephone network such that telephonic communications may be established between the user interface and some remotely located telephonic device. The telephonic devices may include, a telephone, a cellular phone, a voice mail, a fax machine, as well as a pager.

The server also includes the functionality to establish communications over the worldwide web. In one example, the server provides the functionality to transmit e-mail between the user interface and a remotely located mailbox on the worldwide web. The functionality is also provided to transmit both audio and video images from the user interface to a remotely located nodes on the worldwide web.

The network server further includes a searchable database which contains information for establishing communication with persons or entities who have provided the information. As part of a service provided for worldwide web users, subscribers provide phone numbers, e-mail addresses, fax machine numbers, cellular phone numbers, video phone numbers, and various other information for establishing communication. All of this information is associated with the subscriber's name and stored in the database. As described above, functionality is provided in the server for establishing connections through the various modes of communication. For example, means may be provided for establishing telephonic connection for any of the various telephone numbers stored in the database. Means may also be provided for transmitting e-mail, and sending alphanumeric messages to paging service providers. The information stored in the database may be searchable by users who establish a connection with the server. A search engine is provided and the information arranged such that a key word search will locate the relevant communications information about the subscribers.

In order to use the current system, the person seeking to establish a line of communication with a subscriber, accesses the server either through a telephone connection over a modem or through the worldwide web. Once a connection is established with the server, a screen display may be provided through which the system user submits information to identify the particular person to be contacted. If sufficient information is provided, and the person to be contacted is a subscriber of this system, the name will be located in the database and the system user will be provided with a screen display which includes the subscriber's name and a list of modes of communications for the subscriber. For example, a series of icons may be included in the screen display, where each icon is a picture of the desired communication method. The system user may then select the icon representing the desired mode of communication and the server then executes the internal functions which will establish the desired mode of communication between the system user at the user interface and the subscriber.

In order to establish the desired mode of communication, screen displays may be provided for entering additional data in order to facilitate the transfer of information between the parties. For example, in the instance where an e-mail is to be transmitted, the system user would select the e-mail icon, and then a screen display would be displayed which would allow the user to enter an alphanumeric message. Once the user has entered the alphanumeric information in the space provided, the system user would select a send or transmit icon, and at that point the server would then transmit the information to the desired mailbox.

In the case where the system user wishes to establish a telephonic connection, the system user would merely select the icon representing a telephone connection, and at that point the server would attempt to establish a phone connection over the PSTN. If the attempt is successful, the server will facilitate the two-way transmission of information between the parties.

Subscribers to the service may also have the ability to access the database and change their communications information. This access can be gained either through a telephonic connection, or through the worldwide web. Sufficient security may be provided such that only the subscriber and a system administrator may access this information. When the system user does wish to change the information, all of the communications options are shown to the system user in tabular form, and the user can edit this information in the desired fashion.

Other processing modules may also be provided in the server for such things as billing for use. The system user may be able to access a series of screens so that cost of usage can be monitored or detailed billing information can be accessed.

Numerous additional aspects and advantages of the present invention will become apparent to those skilled in the art.

BRIEF DESCRIPTION OF THE DRAWINGS

FIG. 4 discloses an example table from the server database which includes a list of names and the different modes through which communication can be established with the subscribers.

FIG. 6 discloses an example screen display which shows in particular the icons which can be chosen in order to establish communication with the selected person.

FIG. 7 discloses an example table from which a subscriber may edit communications mode information.

DESCRIPTION OF THE PREFERRED EMBODIMENTS

Figure 1:
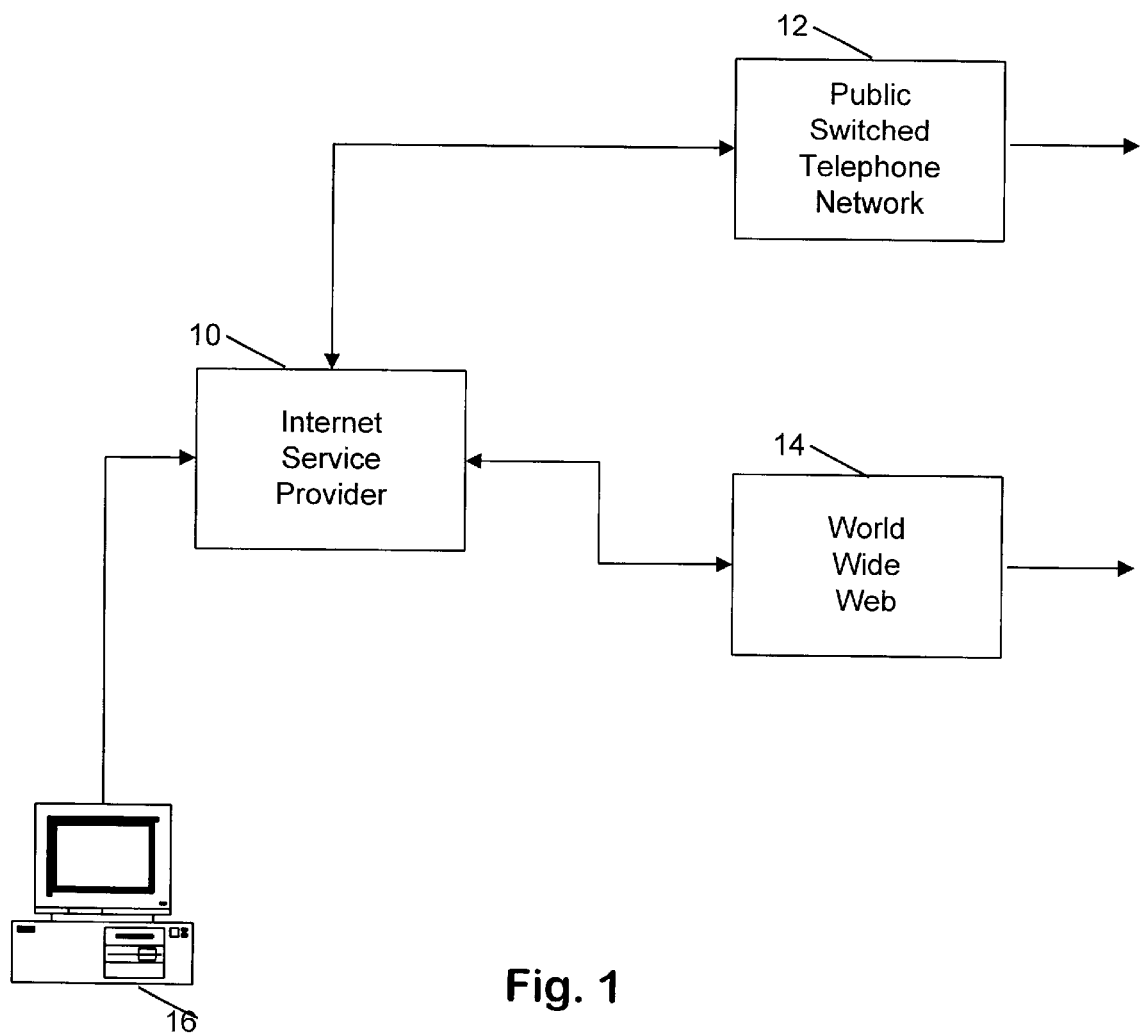
FIG. 1 discloses a diagram for the directory talk system.

Disclosed in FIG. 1 is a system diagram which incorporates the present invention. In this system, a line of communication is established between the graphic user interface 16 and server 10. This line of communication may be established through use of telephone lines, or it may be a direct connection if the user interface and the server are part of a local area network (LAN). The server also has a two-way connection with a data network, such as the worldwide web, so that it may receive and send information over this medium. Finally, a connection is established between the server and the public switch telephone network (PSTN) 12. Through the PSTN, the server may place and receive telephone calls.

In one aspect of the invention, the server 10 is part of a system established by an internet service provider (ISP). The ISPs' provide access to the worldwide web for parties who subscribe to their services. These ISPs' include the functionality for a subscriber to call in over a standard telephone line using a modem and a personal computer. Once a connection is established, the server provides access to the worldwide web. Because the server acts as a node on the data network, information on the ISPs' server is also accessible from the worldwide web.

In addition to access to worldwide web, the server 10 provides the capability for system users to communicate with selected subscribers of the ISP through a variety of modes. In order to implement this service, subscribers provide certain communication information to the ISP, such as telephone numbers, fax numbers, pager numbers, E-mail addresses, etc . . . , which are stored in a database. When a system user accesses the server, this information may be searched and the desired information displayed to the system user. Through the screen display, a variety of modes of communication are presented which the system user may choose from. The server 10 includes enabling hardware and software such that when a mode of communication is selected it may be implemented. The establishment of communication according to the different modes will be described in greater detail below.

Figure 2:
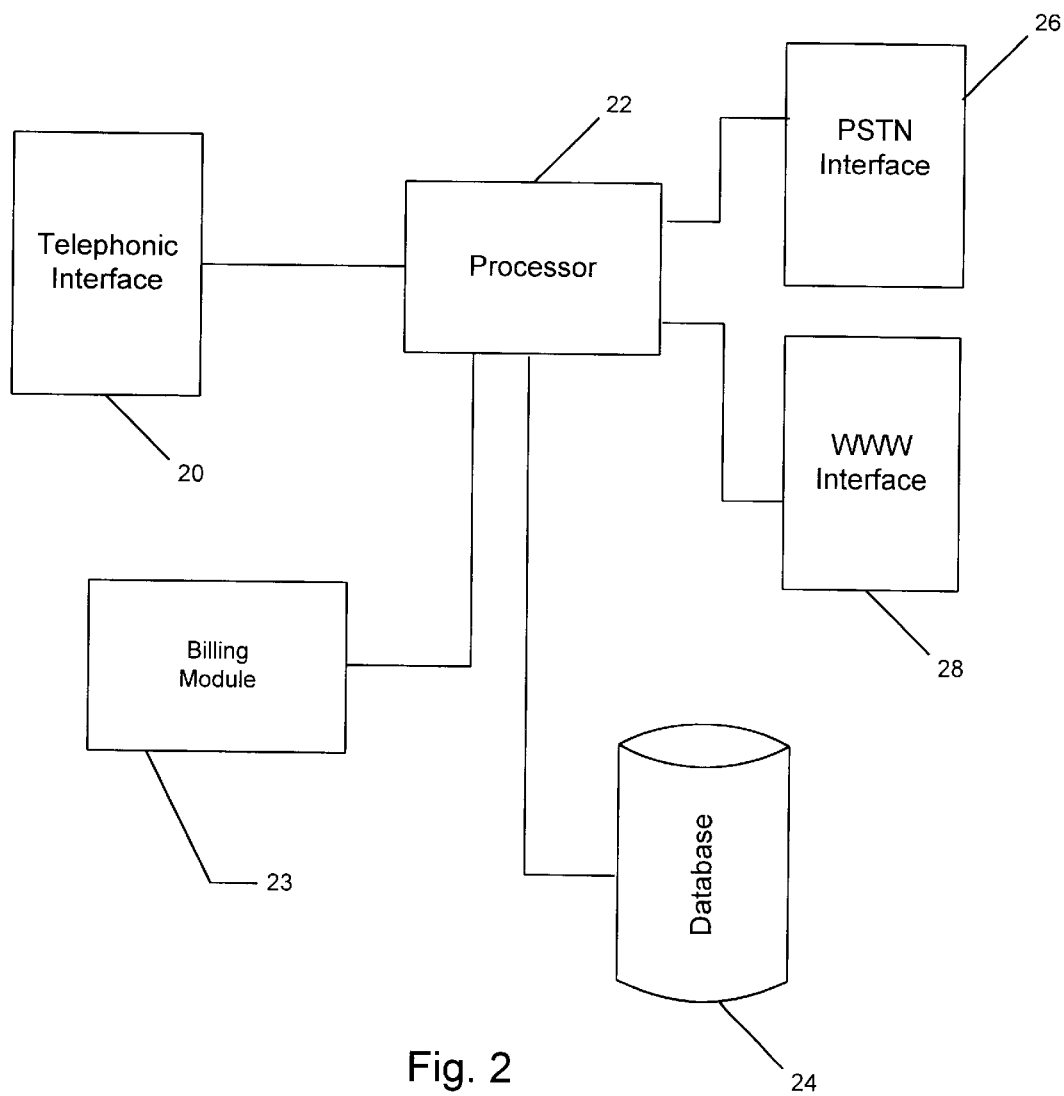
FIG. 2 discloses a system diagram for the directory talk server.

The system diagram for the server 10 is disclosed in FIG. 2. As was previously discussed, communication may be established with the server via the telephone lines. Telephonic interface 20 receives the telephone communications and provides the information to processor 22. Processor 22 is in direct communication with all elements of the server and coordinates all internal functions. Also in connection with processor 22 is database 24. This database contains the names and all the relevant communications information for those who subscribe to the service. Also included in the server are a number of communication interfaces which are necessary in order to provide access to the information and functionality in the server. The worldwide web interface 28 provides a two-way connection between the processor 22 and the worldwide web. Through this interface, subscribers to the service have access to the worldwide web, which includes the receipt and transmission of e-mail, as well as the ability to communicate with other users of the worldwide web through a number of modes which are now possible over the internet. The PSTN interface 26 provides for establishing communication with PSTN so that telephone calls may be placed and received through the server.

Figure 3A:
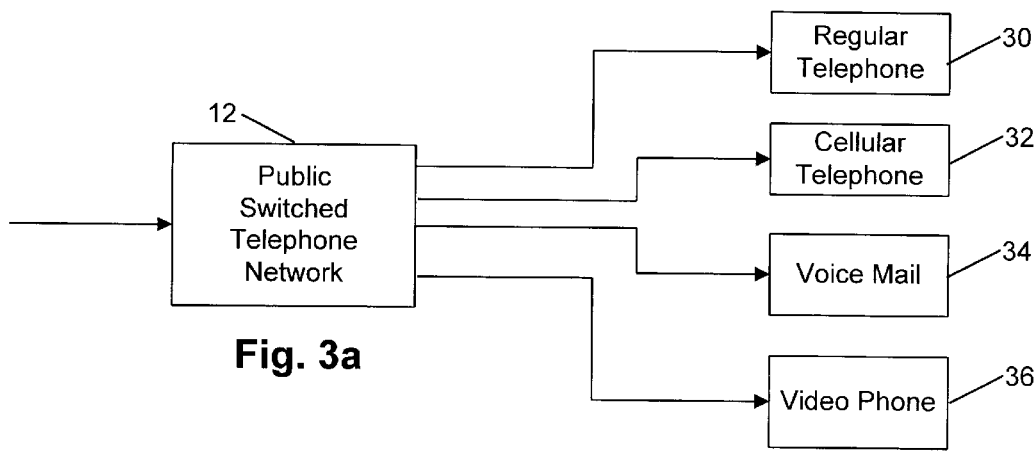
FIGS. 3a and 3b disclose the different modes of communication possible from the different communications interfaces included in the server.
Figure 3B:
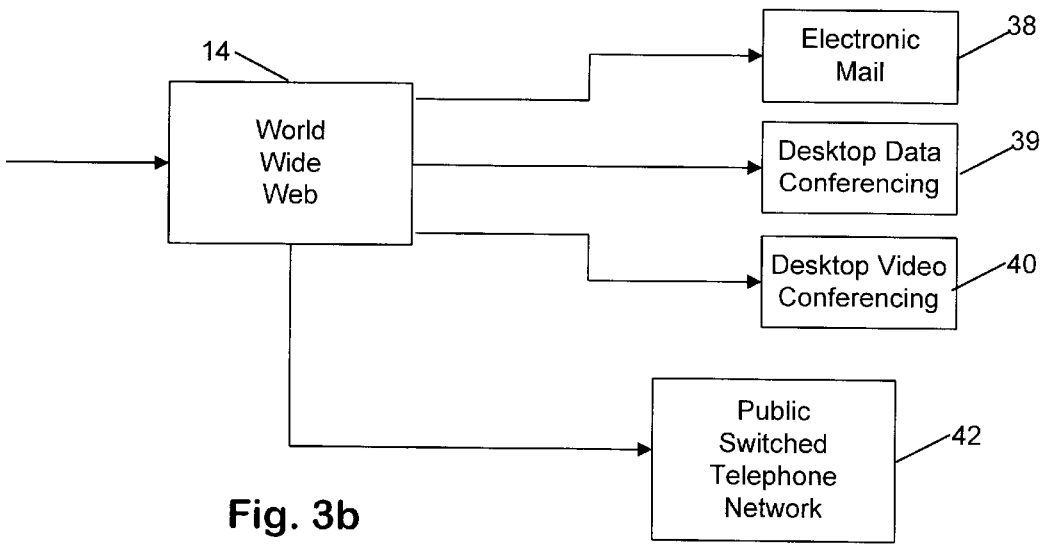

Disclosed in FIG. 3a are the various connections which can be established from the server 10 through the PSTN. Shown in particular are the lines of communication to a regular telephone 30, cellular telephone 32, voice mail 34, video phone 36, and pager 37. A number of modes of communication can also be established over the worldwide web. These are shown in FIG. 3b. These modes include electronic mail, desktop data conferencing, desktop video conferencing, as well as telephone calls placed by a remote node on worldwide web through the PSTN 42.

As described above, the system described in FIGS. 1 and 2 provides a subscriber service for establishing communications through a plurality of modes. A number of modes currently exist for establishing a line of communication to a selected person. These means include a regular telephone, a cellular phone, a voice mail, fax machine, and e-mail. Other possibilities include a video phone, video conferencing, as well as any conceivable electronic communication means. The present invention provides the capability for a system user to establish communication with a subscriber through a variety of different modes by accessing a single web page. The access to these modes of communication may be limited such that a system user may initiate a desired mode of communication without viewing any of the subscriber's personal information (a.k.a., phone numbers, cellular phone numbers, fax numbers, etc.). This provides a measure of security for the subscriber.

This communication service may provided on a subscriber basis. The server 10 include all the necessary hardware and software to establish the lines of communication. Thus, subscribers would provide all the necessary information, such as phone numbers and e-mail addresses to the internet service providers. They may be entered by accessing the server and then entering the information through a screen display. All of these different types of information are entered into a table, an example of which is disclosed in FIG. 4. As can be seen in the table, the left column is filled with the subscriber names. Other information can be associated with the subscriber's name such as home or business address, which may include street, city and state. This additional data will assist in the search for subscriber information. The remainder of the columns are filled with phone numbers and other addresses for establishing communication with the subscriber. The database 24 is relational in nature, and allows a system user to do key word searches to locate particular portions of the information. The information included in this system may be accessible to anyone who has access to the worldwide web or has access to the server.

To begin the process, a system user wishes to contact a particular person but may not possess the necessary information in order to contact that person. At this point the system user either directly contacts the ISP server over the phone lines, or accesses it as a node on the worldwide web. The flow chart in FIG. 5 describes the process a system user follows in order to establish communication with a subscriber. To begin the search process, a web page on server 10 is accessed and a screen display is provided for entering identifying information about the subscriber who will receive the communication. The user can enter anything from a last name, to a full name plus street address. Once the descriptive information has been entered in the system, the processor will perform a search of the database in order to identify the subscriber and associated information. If the selected person is not a subscriber, or the information is insufficient to locate a subscriber, an error message is sent back to the system user via a screen display. At this point, the user can abandon the process or enter additional information in order to narrow down the search. If the desired subscriber is located, a screen display is provided for the system user which includes possible modes of communication to the subscriber.

Disclosed in FIG. 6 is an example of a screen display presented to a system user once the subscriber information has been located. The person's name may be listed at the top of the screen display and then below are a series of icons with written descriptions. The user of the system may select the desired icon in order to initiate the desired mode of communications. For example, if the system user wishes to make a telephone call to John Smith, the user would select the telephone icon and at that point the system processor would initiate the procedures for establishing a telephone connection between the user's personal computer and John Smith. In the example of the telephone call, it is first necessary that the system user have some basic elements included in the user interface so that this type of communication may occur. One thing that may be required would be IP telephony software loaded on the user interface as well as speakers and a microphone. There are a variety of IP telephony software and hardware packages currently available. Once the system user has selected the telephone option, the processor reads the telephone number out of the database and activates the PSTN interface. It is important to note that the telephone number for the subscriber does not have to be-disclosed to the system user.

Over the PSTN, the server dials the telephone number and the telephonic connection is established. The IP telephony software in the user interface is accessed and once the phone call is answered by the subscriber, the conversation may take place. All during the time that communication is established, the processor will apply the necessary conversion of data from the system user to the PSTN to establish normal voice communication. This mode of operation is also applicable to the use of a cellular phone and voice mail. It is also feasible that subscriber may answer the phone call with a user interface with IP telephony capabilities.

In the situation where system user may wish to fax data to the subscriber, the system user would select the fax machine icon. Once this selection is made, the processor locates the appropriate phone number in the table for the fax machine. The server then provides a screen display to the system user for manual entry of alphanumeric information. Functionality would also be provided for attaching documents in such word processing formats as Microsoft Word and WordPerfect. After the necessary data has been entered through the screen display, the system user will then select a send button which will then cause the processor to contact the PSTN interface and dial the appropriate number over the PSTN. Once a contact has been established with the subscriber's fax machine, the processor transmits the data which had been entered in the screen display. After transmission is complete, the processor may provide the system user with notification that the transmission was successful.

The communication server described herein may also provide communication to a number of different types of pagers. In the case where the system user has chosen to communicate with the subscriber through a pager with voice mail, the appropriate icon is first selected from the list of communication modes. Once the desired mode has been selected, the processor reads the appropriate phone number from the database and establishes communication with the pager service over the PSTN. As with establishing contact over the telephone lines as previously described, the system user must have speakers and a microphone as well as other IP Telephony software incorporated into the user interface. Once communication has been established, the system user may provide the paging information either through speaking to the pager service operator or punching in the appropriate numbers through the computer key pad. In the situation where the paging service transmits alphanumeric messages to pager, the server provides a screen display for entry of alphanumeric information. Once the user has entered the information, a send button is provided in order to transmit the information. Once the button is activated, the processor will establish contact with the paging service via the PSTN. Once contact is established, the information is transmitted to the paging service.

Figure 5:
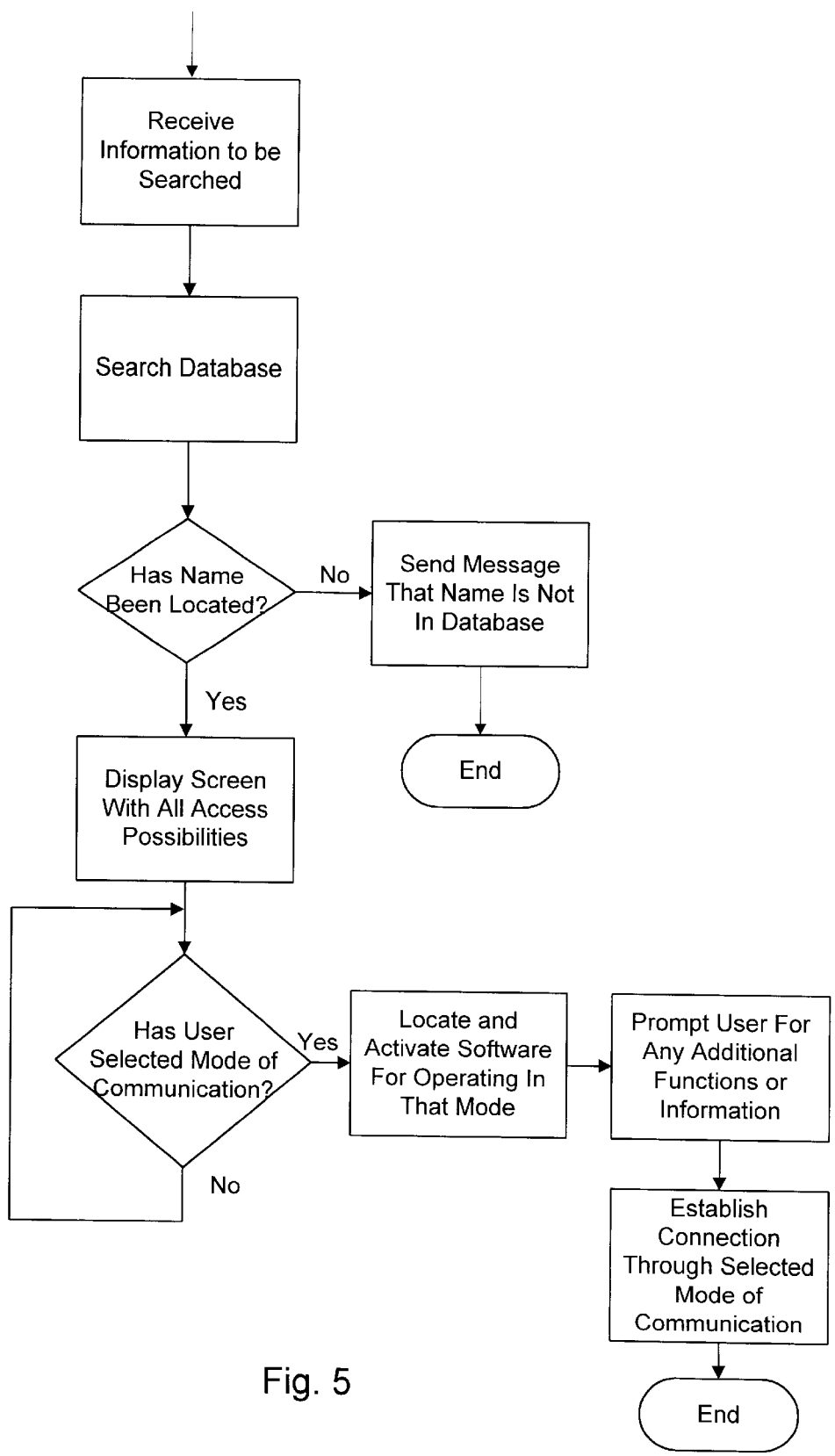
FIG. 5 discloses a flow diagram which describe the operation of the directory talk server.

If a system user wishes to send an e-mail to the subscriber, the electronic mail icon on the screen display shown in FIG. 5 is selected. Once this option has been chosen, the processor will access the e-mail address listed in the table and provide a screen display for the system user to enter in the desired, alphanumeric information for the e-mail message.

Once the entry of information for the e-mail message is complete, a send function may be activated and the processor then activates the worldwide web interface and transmits the e-mail to the appropriate mailbox.

An additional mode of communication which may be provided for the subscriber is desktop data conferencing and desktop video conferencing. Systems currently exist for establishing data and video conferences via the worldwide web. In the case where the system user wishes to establish one of these conferences with the subscriber, the system user would choose the appropriate icon from the screen display. In the case where a desktop video conference is to be established, both the system user and the subscriber will have some basic equipment included in their user interfaces. This may include a camera, microphone, speakers, and image processing software. Once the system user has chosen to establish a desktop conference, the processor retrieves the address information from the database, and through the worldwide web interface establishes a connection with the subscriber's conferencing equipment. The processor then provides the interface for processing of the two way transfer of data, image and audio information.

A connection to the PSTN may also be established through a remote node of the worldwide web. In certain situations it may be desirable to establish a connection in this manner rather than a direct connection from the server 10. If the long distance connection is made over the worldwide web it may provide some cost advantage. In this case, all of the above telephonic, alphanumeric, and imaging transmitting functions which were previously directly transmitted through the PSTN can be sent over the worldwide web using technologies which currently exist in the art.

Because subscriber information may change on a fairly regular basis, the ISP will provide access to the subscriber for their communications information. Whenever a subscriber wishes to make additions, deletions, and amendments to their personal information, the subscriber would first access the server through the telephonic interface or over the worldwide web. A screen display is then provided for the subscriber to enter the personal and security information in order to have access to their account. These types of information may include passwords and other personal information only known to the subscriber. Once the security measures have been satisfied, the processor allows access to the database. The subscriber's own personal information is displayed in tabular form as was shown in FIG. 7, and the subscriber may make the appropriate amendments as the information changes. The information is identified on the screen display so that the user merely has to delete information shown on the display and then enter new information to replace it. The new information is stored in database 24.

Also included in the communications processor as shown in FIG. 2 is the billing module 23. This module monitors the usage of the different modes of communication and generates a bill for the subscriber. Since the different modes of communication will have different rates associated with them, the billing module includes the functionality to distinguish between different types of communications and bill the subscriber the appropriate amount. For example, telephone connections may have a base charge associated with them as well as a time related rate. In the case of a e-mail being transmitted over the worldwide web, this type of transaction may just have a one time charge associated with it. The subscriber may access this billing information through the server via the phone lines or over the worldwide web. Alternately, a billing program may be established which bills system users for their use of the communications system. If a system user is a subscriber to the ISP, an account may be established, and the system user billed based on the use of the system.

The foregoing description of the present invention has been presented for purposes of illustration and description. Furthermore, the description is not intended to limit the invention to the form disclosed herein. Consequently, variations and modifications commensurate with the above teaching, and the skill or knowledge of the relevant art, are within the scope of the present invention. The embodiments described hereinabove are further intended to explain best modes known for practicing the invention and to enable others skilled in the art to utilize the invention in such or other embodiments and with various modifications required by the particular applications or uses of the present invention. It is intended that the claims be construed to include alternative embodiments to the extent permitted by the prior art.

What is claimed is:

1. A system for providing communication between a system user and at least a first subscriber comprising:

at least one data network interface connectable with a data network configured to receive and transmit data signals;

a searchable database in communication with the data network interface which includes subscriber communication mode information;

a processor in connection with the data network interface which is configurable to search the database in response to signals received over the data network and is further configured to provide identified portions of the subscriber communication mode information for a particular subscriber;

the processor, further configured to detect selection of a mode of communication from the subscriber communication mode information for a particular subscriber and to automatically initiate the selected mode of communication over the data network; and the processor being further configured such that upon selection of at least one mode of communication requiring entry of alphanumeric information, the processor presents at least one screen display whereby the system user may enter the alphanumeric information an upon activation of a send function by the system user transmits the alphanumeric information according to the selected mode of communication.

2. The system of claim 1 wherein the at least one data network interface provides a connection to the public switched telephone network (PSTN).

3. The system of claim 1 wherein the data network is the worldwide web.

4. The system of claim 1 wherein the subscriber communication mode information includes at least one of: a phone number, a fax machine number, an e-mail address, a video phone number, voice mail, alphanumeric pager, numeric pager, voice pager, personal access number, desktop data conferencing address, and desktop video conferencing address.

5. The system of claim 1 wherein a screen display is presentable by the processor through the data network, wherein the screen display includes the subscriber mode communication for a particular subscriber.

6. The system of claim 1 wherein the at least one data network interface, the searchable database, the processor, and the at least one communications interface are incorporated into a network server.

7. The system of claim 1 wherein the at least one mode of communication requiring entry of alphanumeric information includes at least one of: email, fax, and alphanumeric pager.

8. The system of claim 1 wherein the network server further includes a billing module which monitors usage of the processor and calculates charges based on usage.

9. The system of claim 8 wherein the billing module is further configured to calculate different charges based on the mode of communication used.

10. A method for establishing communication through a plurality of modes through a network server, comprising the step of:

providing a database in communication with the network server which includes communication mode information for selected parties;

receiving an inquiry from the system user at the network server over a data network;

searching and retrieving from the database the communication mode information for a selected party based on the inquiry from the system user;

displaying to the system user from the network server one or more screen displays which include a plurality of modes of communication selectable by the system user for communicating with the selected party;

based on a selection made by the system user, establishing a line of communication between the system user and the selected party; and wherein if the selected mode of communication requires entry of alphanumeric information, presenting at least one screen display whereby the system user may enter the alphanumeric information and upon detection of a send function initiated by the system user, transmitting the entered alphanumeric information from the network server according to the selected mode of communication.

11. The method of claim 10 wherein the communication mode information include at least one of: personal phone number, business phone number, pager number, e-mail address, cellular phone number, personal access number, desktop data conferencing address, and desktop video conferencing address.

12. The method of claim 10 wherein access is provided to the database for the selected parties to amend communication information.

13. The method of claim 10 wherein establishing a line of communication comprises transmitting and receiving information over a public switched telephone network.

14. The method of claim 10 wherein establishing a line of communication comprises transmitting and receiving information over the worldwide web.

15. The method of claim 10 wherein the inquiry is received from a personal computer over a telephone line.

16. The method of claim 10 wherein the mode of communication requires entry of alphanumeric information includes at least one of: email, fax, and alphanumeric pager.

17. The method of claim 10 further comprising the step of calculating charges for usage of the selected mode of communications.

18. The method of claim 17 wherein the charges are calculated based on the selected mode of communication.

* * * * *